(12) United States Patent
Shigeta

(10) Patent No.: US 12,542,028 B2
(45) Date of Patent: Feb. 3, 2026

(54) MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 231 days.

(21) Appl. No.: 18/266,926

(22) PCT Filed: Dec. 13, 2021

(86) PCT No.: PCT/JP2021/045868
§ 371 (c)(1),
(2) Date: Jun. 13, 2023

(87) PCT Pub. No.: WO2022/131221
PCT Pub. Date: Jun. 23, 2022

(65) Prior Publication Data
US 2024/0105004 A1    Mar. 28, 2024

(30) Foreign Application Priority Data

Dec. 15, 2020  (JP) .................................. 2020-207691
Feb. 2, 2021    (JP) .................................. 2021-015270

(51) Int. Cl.
*G07F 17/32*     (2006.01)
*G06K 7/10*      (2006.01)
(Continued)

(52) U.S. Cl.
CPC ..... *G07F 17/3241* (2013.01); *G06K 7/10366* (2013.01); *G06Q 20/4016* (2013.01);
(Continued)

(58) Field of Classification Search
None
See application file for complete search history.

(56) References Cited

U.S. PATENT DOCUMENTS 11,682,262 B2 *   6/2023   Feng et al. .............. G07F 17/32
2002/0045478 A1   4/2002   Soltys et al.
(Continued)

FOREIGN PATENT DOCUMENTS

JP    2006304873 A    11/2006
JP    2016150271 A    8/2016
(Continued)

OTHER PUBLICATIONS

International Search Report dated Mar. 1, 2022 issued for PCT/JP2021/045868.
(Continued)

*Primary Examiner* — Ronald Laneau
(74) *Attorney, Agent, or Firm* — NORTON ROSE FULBRIGHT US LLP

(57) ABSTRACT

A management system includes a camera configured to capture an image of a plurality of gaming chips having an RFID tag storing first information and having second information written on a surface thereof; a reading device configured to read the first information from the RFID tags of the plurality of gaming chips; an image analysis unit configured to obtain, based on the image, a location of each of the plurality of gaming chips and the second information; and a comparison and judgment unit configured to identify a location of a problem gaming chip, by comparing the first information obtained by the reading device with the second information obtained by the image analysis unit.

27 Claims, 14 Drawing Sheets

(51) Int. Cl.
*G06Q 20/40* (2012.01)
*G06T 7/70* (2017.01)
*G06V 20/52* (2022.01)

(52) U.S. Cl.
CPC ............... *G06T 7/70* (2017.01); *G06V 20/52* (2022.01); *G07F 17/322* (2013.01); *G07F 17/3232* (2013.01); *G07F 17/3248* (2013.01); *G06T 2207/30232* (2013.01)

(56) References Cited

U.S. PATENT DOCUMENTS

| | | |
|---|---|---|
| 2007/0060311 A1 | 3/2007 | Rowe et al. |
| 2007/0184898 A1 | 8/2007 | Miller et al. |
| 2008/0234052 A1 | 9/2008 | Steil |
| 2010/0105486 A1 | 4/2010 | Shigeta |
| 2011/0227703 A1 | 9/2011 | Kotab |
| 2015/0038206 A1 | 2/2015 | Walton et al. |
| 2015/0199872 A1 | 7/2015 | George et al. |
| 2018/0336757 A1 | 11/2018 | Shigeta |
| 2019/0102987 A1 | 4/2019 | Shigeta |
| 2019/0172312 A1 | 6/2019 | Shigeta |
| 2019/0259238 A1 | 8/2019 | Shigeta |
| 2019/0325178 A1 | 10/2019 | Nam |
| 2019/0392273 A1 | 12/2019 | Shigeta |
| 2020/0234529 A1 | 7/2020 | Gronau et al. |
| 2020/0349806 A1 | 11/2020 | Shigeta |
| 2021/0256806 A1* | 8/2021 | Shigeta ............... G07F 17/3241 |
| 2022/0189245 A1* | 6/2022 | Shigeta ............... G07F 17/3241 |

FOREIGN PATENT DOCUMENTS

| | | |
|---|---|---|
| WO | 2008120749 A1 | 10/2008 |
| WO | 2018147451 A1 | 8/2018 |
| WO | 2018181867 A1 | 10/2018 |
| WO | 2019111593 A1 | 6/2019 |
| WO | 2019159954 A1 | 8/2019 |
| WO | 2019217639 A1 | 11/2019 |

OTHER PUBLICATIONS

US Office Action dated Aug. 14, 2024 issued for U.S. Appl. No. 17/551,037.
US Office Action dated Nov. 24, 2023 issued for U.S. Appl. No. 17/551,037.
US Office Action dated Jun. 4, 2025, issued in U.S. Appl. No. 17/551,037.
"NEC Solution Innovators uses image recognition to visualize food production status and defective product occurrences" by Keizo Hikawa, published on IT Leaders (https://it.impress.co.jp/articles/-/16891), published on Oct. 24, 2018.
Japanese Office Action dated Dec. 2, 2025, issued for JP Application No. 2021-202109.

* cited by examiner

MANAGEMENT SYSTEM

CROSS-REFERENCE OF RELATED APPLICATIONS

This application is a national phase application under 35 U.S.C. § 371 of International Pat. App. No. PCT/JP2021/045868, which claims the benefit of priority to JP Pat. App. No. 2020-207691 filed Dec. 15, 2020, and JP Pat. App. No. 2021-15270 filed Feb. 2, 2021, the contents of each application are hereby incorporated by reference.

TECHNICAL FIELD

The present disclosure relates to a management system for managing RFID-equipped gaming chips in a gaming facility (e.g., a casino) that uses gaming chips.

BACKGROUND TECHNOLOGY

Among the many table games played in casinos and other amusement facilities are baccarat and blackjack. In casinos, gaming chips are used for these games.

In casinos, RFID tags are embedded in gaming chips to verify that the amounts paid and collected in games are correct, and to identify and manage the location and owner of the gaming chips. RFID-equipped gaming chips are known to the public, for example, International Application Publication No. WO2/008/120749.

SUMMARY

The RFID tag of an RFID-equipped gaming chip stores, for example, identification information that identifies the gaming chip and information that indicates the value, type, and casino in which the gaming chip is used. By using the information stored in the RFID tag, it is possible to determine the authenticity of the gaming chip. For example, if the information cannot be read when a gaming chip is read by an RFID reader, it can be assumed that the RFID tag is faulty or that it is a counterfeit gaming chip that does not have an RFID tag.

The RFID reader can read the RFID tags of multiple RFID-equipped gaming chips (e.g., multiple RFID gaming chips stored in the dealer chip tray of a game table) simultaneously. Therefore, RFID has the advantage that multiple gaming chips can be inspected simultaneously at once, without the need to inspect each gaming chip one by one. On the other hand, it is difficult for the RFID reader to read multiple nearby RFID-equipped gaming chips individually.

If the RFID tags of a large number of gaming chips are read at the same time, even though it is possible to find that there is a gaming chip with a problem in its RFID tag (i.e., the RFID tag is faulty, the RFID tag is missing, the information stored in the RFID tag is incorrect, etc.), it is difficult to determine which specific gaming chip has such a problem. In order to identify a gaming chip with a problem from a large number of gaming chips, for example, it is necessary to read the RFID tags of gaming chips one by one with an inspection device, which is a very time-consuming process.

In addition, there is a case in which, an RFID tag can be read normally when the inspection device reads the gaming chips one by one, but the RFID tag is not read properly when the reading is done on the table or in a chip tray where the gaming chips are actually used. In this case, even if the inspection device inspects the gaming chips one by one, it will not be able to identify the gaming chips with such a problem. Furthermore, if the RFID tag is faulty, or if there is no RFID tag, it may not even be possible to ascertain the existence of such a gaming chip.

The present disclosure provides a management system that can identify a gaming chip with problem in RFID tag.

A management system of an embodiment comprises: an image capturing device configured to capture a plurality of gaming chips having a built-in RFID tag storing first information and having second information written on a surface thereof to generate an image; a reading device configured to read the RFID tags of the plurality of gaming chips to obtain the first information of the plurality of gaming chips; an image analysis device configured to obtain a location of each of the plurality of gaming chips and the second information, based on the image; and a control device configured to identify a location of a problem gaming chip whose RFID tag is fraudulent, damaged, or possibility thereof, or whose notation is fraudulent or possibly fraudulent, by comparing the first information of the plurality of gaming chips obtained by the reading device with the second information of each of the plurality of gaming chips obtained by the image analysis device.

In the management system described above, the control device may be configured to identify the location of the gaming chips having the second information not corresponding to the first information as the problem gaming chips.

In the management system described above, the control device may be configured to identify the location of the gaming chip having the second information, for which the corresponding first information is not obtained, as the problem gaming chip.

In the management system described above, the control device may be configured to identify the location of the gaming chip having the RFID tag in which the first information not corresponding to the second information is stored as the problem gaming chip.

In the management system described above, the control device may be configured to identify the location of the gaming chip having the RFID tag in which the first information for which the corresponding second information is not obtained is stored as the problem gaming chip.

In the management system described above, the control device may be configured to use information other than the first information and the second information of the problem gaming chip to determine whether the problem is in the RFID tag or the notation.

In the management system described above, the gaming chip may have an appearance that enables identification of a type of the gaming chip, the image analysis device may be configured to determine the type of each of the plurality of gaming chips based on the image, the control device may be configured to determine which of the RFID tag and the notation is wrong based on the type determined by the image analysis device.

In the management system described above, the gaming chip may have an appearance that enables identification of a type of the gaming chip, the second information may be unique for each of the types, the image analysis device may be configured to obtain the second information and determine the type for each of the plurality of gaming chips based on the image, and the control device may be configured to compare the first information with a combination of the second information and information of the type.

In the management system described above, the gaming chip may have an appearance that enables identification of a type of the gaming chip, the image analysis device may be configured to, for each of the plurality of gaming chips, obtain the second information and determine the type, based on the image, and the control device may be configured to, in the case where the second information cannot be read, or in the case where it is determined that there is the problem gaming chip, identify the second information using the information of the type determined by the image analysis device and compare the identified second information with the first information.

In the management system described above, the gaming chip may have an appearance on a side thereof that can identify the type of the gaming chip.

The management system described above may further comprise a housing unit configured to accommodate the plurality of gaming chips, wherein the imaging capturing device may be configured to capture the plurality of gaming chips accommodated in the housing unit.

In the management system described above, the housing unit may be configured to accommodate the plurality of gaming chips in an aligned manner.

In the management system described above, the housing unit may be a chip tray provided on a game table.

In the management system described above, the image capturing device may be fixed to the game table.

In the management system described above, the second information may be written on the side of the gaming chip.

In the management system described above, the second information may be information represented by a matrix pattern, a dot pattern, a barcode, a sequence of numbers, or a sequence of letters, the image analysis device may be configured to obtain the second information by decoding the matrix pattern, the dot pattern, or the barcode, or by recognizing the sequence of numbers or the sequence of letters.

In the management system described above, the first information may be a unique ID that uniquely identifies the gaming chip.

In the management system described above, the second information may be the same unique ID as the first information.

In the management system described above, the first information and the second information may be different information from each other, the management system may further comprise a database that records a combination of the first information and the second information for each gaming chip, and the control device may be configured to perform the comparison by referring to the database.

In the management system described above, the second information may be duplicated in some of the plurality of gaming chips, and the control device may be configured to, when a plurality of identical second information is obtained, and the number of the identical second information is greater than the number of first information corresponding to the identical second information, determine the plurality of the gaming chips on which the identical second information are represented as the problem gaming chips and identify each of the locations of the plurality of problem gaming chips.

In the management system a described above, the second information may be duplicated in some of the plurality of gaming chips, and the control device may be configured to, when a plurality of identical second information is obtained, and the number of the identical second information is greater than the number of first information corresponding to the identical second information, determine the plurality of the gaming chips on which the identical second information are represented as the problem gaming chips and identify an area of the plurality of problem gaming chips.

In the management system described above, the second information may be duplicated in some of the plurality of gaming chips, and the control device may be configured to, when there is a plurality of candidates for the first information for which the corresponding second information is not obtained, identify the plurality of candidates for the first information.

The management system described above may further comprise a display device configured to indicate the location of the problem gaming chip.

In the management system described above, the display device is configured to superimposes the location on the image.

The management system described above may further comprise a housing unit capable of accommodating the plurality of gaming chips in a predetermined accommodating position, the image capturing device may be configured to capture the plurality of gaming chips accommodated in the housing unit, and the display device may be configured to display an address of the accommodating position of the problem gaming chip in the housing unit.

The management system described above may further comprise: a housing unit capable of accommodating the plurality of gaming chips in an aligned manner; and a light irradiation device configured to irradiate light to a designated gaming chip among the plurality of gaming chips accommodated in the housing unit, wherein the image capturing device may be configured to capture the plurality of gaming chips accommodated in the housing unit, the control device may be configured to control the light irradiation device to irradiate light on the problem gaming chip for which the location has been identified.

A management system of another embodiment comprises: an image capturing device configured to capture a plurality of gaming chips having a built-in RFID tag storing first information and having second information written on surface thereon to generate an image; a reading device configured to read the RFID tags of the plurality of gaming chips to obtain the first information of the plurality of gaming chips; an image analysis device configured to obtain a location of each of the plurality of gaming chips and the second information based on the image; and a control device configured to, when there is a specific first information in the first information of the plurality of gaming chips obtained by the reading device, identify a location of the second information corresponding to the specific first information.

BRIEF DESCRIPTION OF THE DRAWINGS

DETAILED DESCRIPTION OF THE EMBODIMENT (First Embodiment) FIG. 1 shows a game table to which the management system of the first embodiment is applied. As shown in FIG. 1, the game table 50 has a table surface having a roughly rectangular shape. The dealer D is located on one side of the game table 50, and the player P participating in the game is located on the other side.

Figure 1:
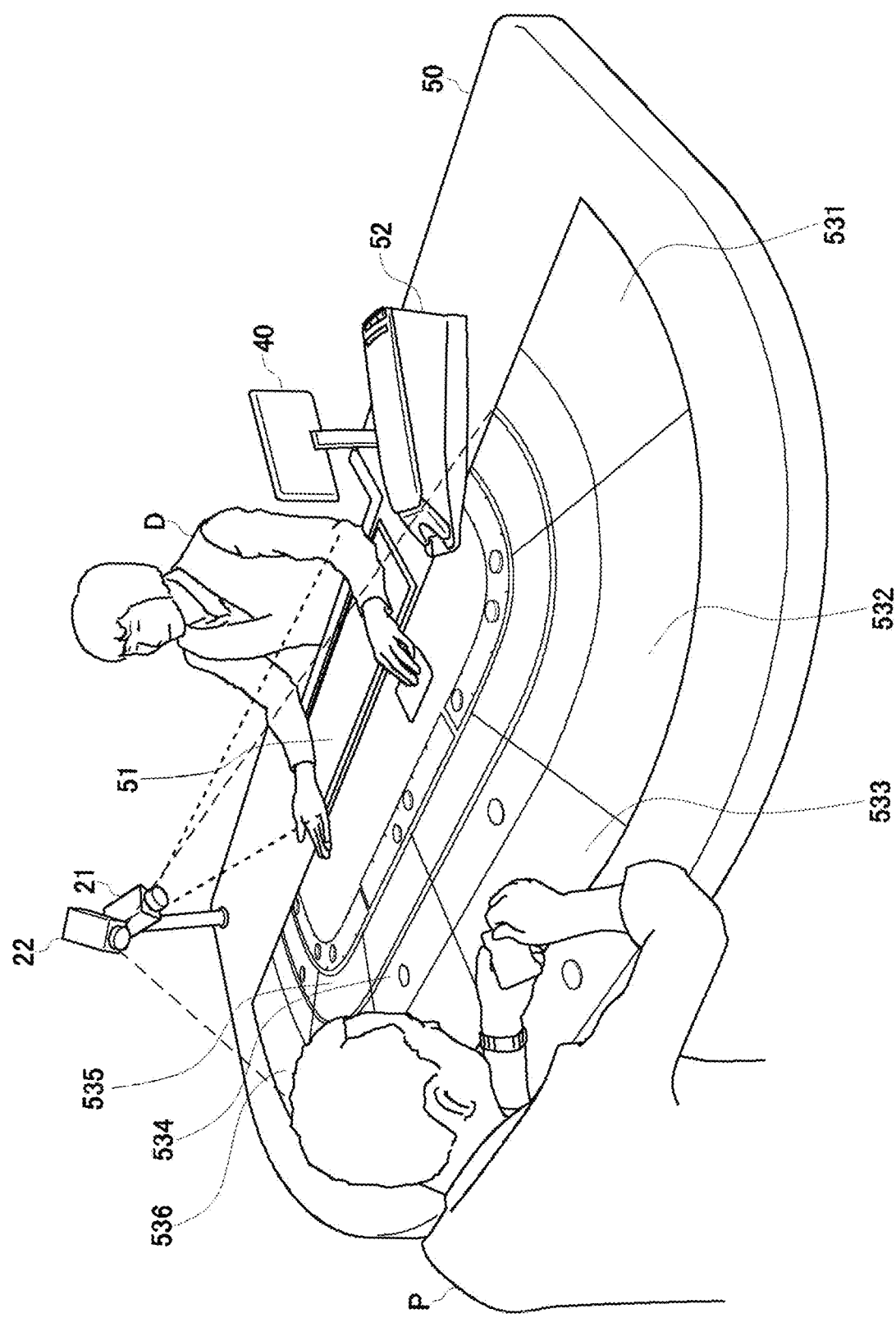
FIG. 1 shows a game table to which the management system of the embodiment is applied.

In addition, betting areas are laid out on the table surface according to the type of game. In the example of FIG. 1, the game table 50 has a lay out for baccarat. The table surface has betting areas 531-536, each including a player area, banker area, and tie area, divided for each player position, as well as betting areas for side bets such as player pairs and banker pairs. A player P can participate in the game by placing his/her gaming chip to be bet in the betting area (player area, banker area, etc.) at the player position.

A chip tray 51 is provided on the dealer side of the game table 50 to accommodate the gaming chips owned by the dealer. An electronic shoe 52 is placed on the table surface of the game table 50 for drawing game cards therefrom one by one. In addition, the game table 50 is equipped with a camera 21, a camera 22, and a monitor 40.

Figure 2:
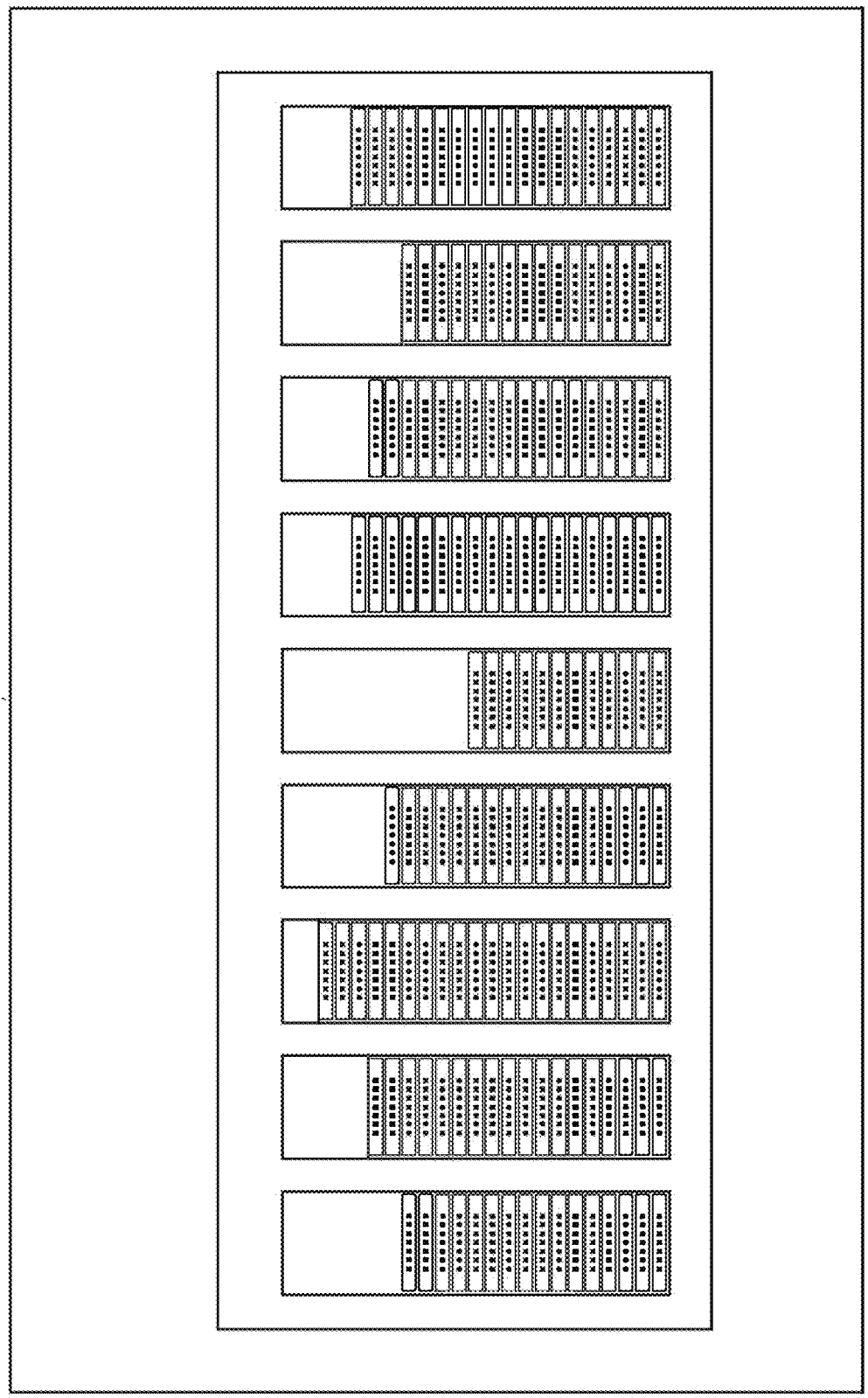
FIG. 2 shows an example of an image obtained by processing an image captured by a camera of the embodiment.

The camera 21 is designed with its optical axis direction, angle of view, etc., to capture the gaming chips housed in the chip tray 51. In the example of FIG. 1, the camera 21 is fixed and set on the game table 50 to photograph the chip tray 51 from diagonally above. FIG. 2 shows an example of an image obtained by processing the image captured by the camera 21, such as trapezoidal correction.

The chip tray 51 has a chip float consisting of a plurality of columns. Each column can accommodate a plurality of gaming chips stacked in the direction of their thickness and aligned along the column. The columns are formed horizontally and have a half-tube shape with the top half released. The sides of the gaming chips housed in the column can be observed from the upper side of the chip tray 51.

Figure 3A:
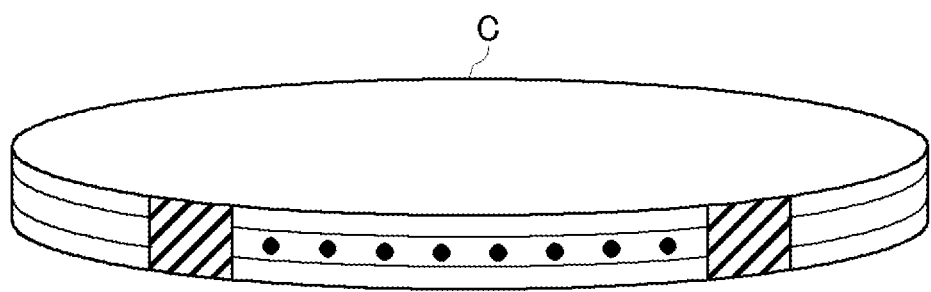
FIG. 3A shows an example of a gaming chip of the embodiment.
Figure 3B:
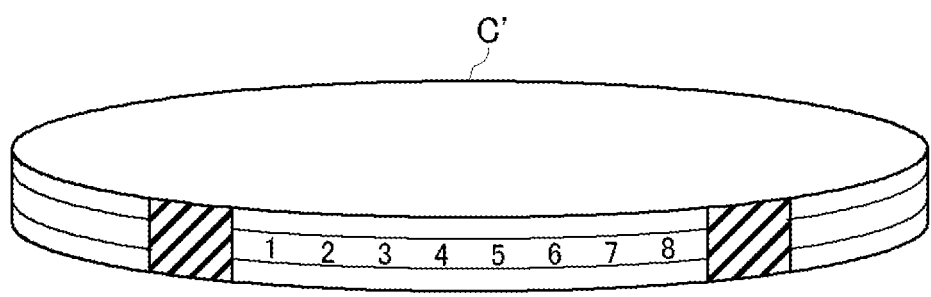
FIG. 3B shows another example of a gaming chip of the embodiment.

FIG. 3A shows an example of a gaming chip of the embodiment, and FIG. 3B shows another example of a gaming chip of the embodiment. As shown in FIGS. 3A and 3B, the gaming chips C and C' are marked on the side with a side ID as identification information. In the example of FIG. 3A, the side ID is represented by the presence or absence of a plurality of dots (dot pattern). In this example, the side ID is expressed by the presence or absence of dots in a dot string consisting of eight dots, so the information can be expressed as eighth powers of two. In the example in FIG. 3B, the side ID is represented by a sequence of numbers. In this example, the side ID is represented by eight digits, so it can represent information in eight powers of ten. The side ID may be expressed as a matrix pattern, barcode, or character string. The side ID is represented within ⅙ of the circumferential area of the side of the gaming chip. A plurality of side IDs are represented on the side of the gaming chip at predetermined intervals in the circumferential direction.

The side ID may be a unique ID that uniquely identifies each gaming chip, or it may be information that indicates the group (e.g., value) to which each gaming chip belongs, i.e., information that may be duplicated with other gaming chips. In particular, if the side ID is represented by a sequence of numbers, the side ID may be a unique ID; if the side ID is represented by a dot pattern (dot sequence), the side ID may be information about the group to which the gaming chip belongs.

The sides of the gaming chips C and C' are divided into three layers in the thickness direction. In this embodiment, the first and third layers are different colors depending on the value of the gaming chip, and the second layer in the center (the center line) is a color common to all gaming chips of any value (e.g., black). The side ID can be indicated by printing or laser engraving.

An RFID tag is embedded in the gaming chip. The RFID tag contains at least a unique ID that uniquely identifies the gaming chip and information on the group (e.g., value) to which the gaming chip belongs. In this embodiment, the unique ID stored in the RFID tag and the unique ID described as the side ID are the same ID, but they may be different IDs and the two IDs given to the same gaming chip may be associated in the database.

The gaming chip has a built-in capsule, and the RFID tag is housed in the capsule. On the outside of the capsule, there is a decal with information about the value of the gaming chip and the casino where the gaming chip is used. The capsule has a unique ID printed on it that uniquely identifies the gaming chip. The unique ID printed on the capsule may be the same as the unique ID stored in the RFID tag, or it may be different. If the unique ID printed on the capsule is different from the unique ID stored in the RFID tag, the unique IDs may be associated and stored in the database. The unique ID may be printed on the surface of the chip under the decal. The unique ID may be printed on the surface of the chip by an invisible ink such as UV ink or infrared absorbing ink.

Returning to FIG. 1, the camera 22 is fixed and installed on the game table 50 so as to capture the gaming chips bet on betting areas 531 to 536. In this embodiment, one camera 22 captures all betting areas 531 to 536, but these multiple betting areas 531 to 536 may be divided and captured by multiple cameras.

Figure 4:
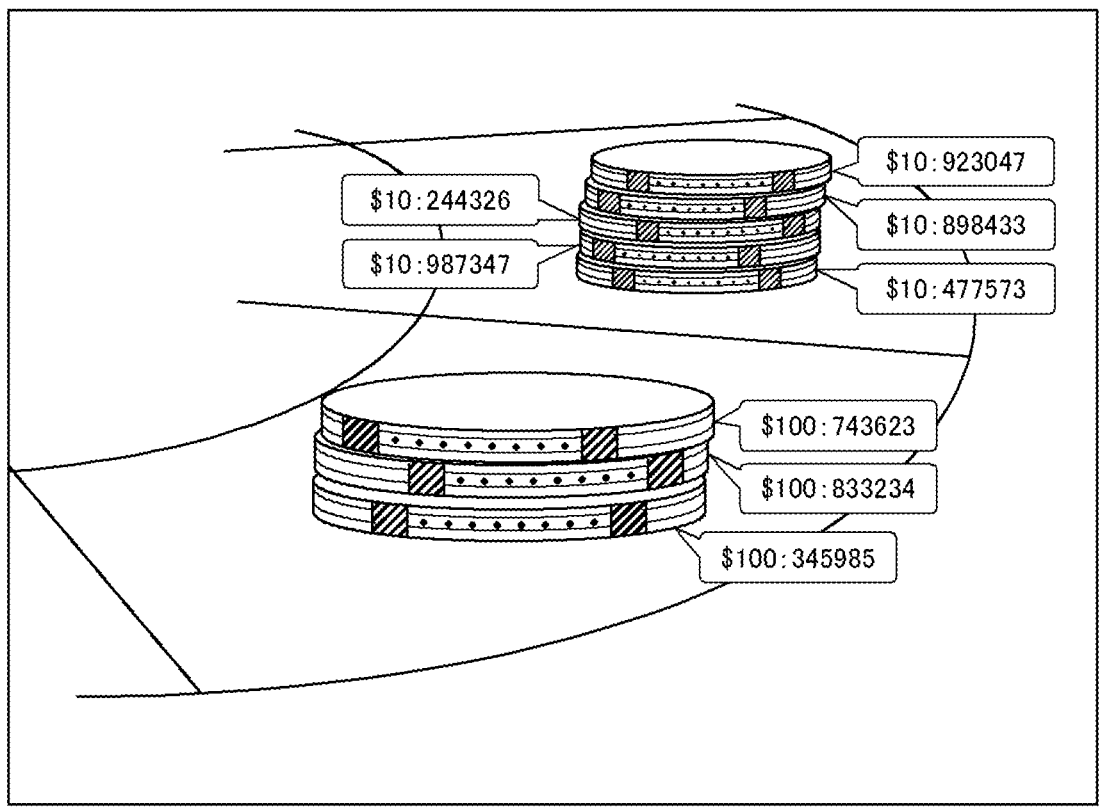
FIG. 4 shows an example of an image captured by a camera of the embodiment.

FIG. 4 shows an example of an image captured by camera 22. In the example of FIG. 4, multiple stacks of gaming chips placed in multiple betting areas are captured. The sides of the chips can be observed in the image captured by the camera 22.

Returning to FIG. 1, a monitor 40 is provided to display information to the dealer. The monitor 40 may be a display panel, or it may be a touch-operable display panel (or touch panel).

The electronic shoe 52 has a configuration in which cards are drawn one by one by operation of the dealer, and information is read from the cards being drawn to obtain information on the rank of the card being drawn. The electronic shoe 52 determines the game result (player win, banker win, tie, etc.) based on the read rank and the rules of the baccarat game.

The player P participates in a game by placing gaming chips on the betting target in the betting area, and if he/she wins the game, he/she will receive a payout of gaming chips from the chip tray 51 by the dealer. If the player loses the game, the betting chips are collected by the dealer and placed in the chip tray 51. In this way, depending on the game results and bets, the gaming chips held by the player are stored in the chip tray 51, or the gaming chips stored in the chip tray 51 are paid to the player.

Therefore, it is desirable to be able to detect a gaming chip with a fraudulent, damage, or possibility thereof in RFID, or fraudulent or possibility thereof in notation (hereinafter simply referred to as a "problem gaming chip") for the gaming chips stored in the chip tray 51. It is also desirable to be able to detect problem gaming chips in the betting areas 531 to 536. Therefore, in this embodiment, a management system that can present the dealer with information that can identify the location of the problem gaming chips is provided.

Figure 5:
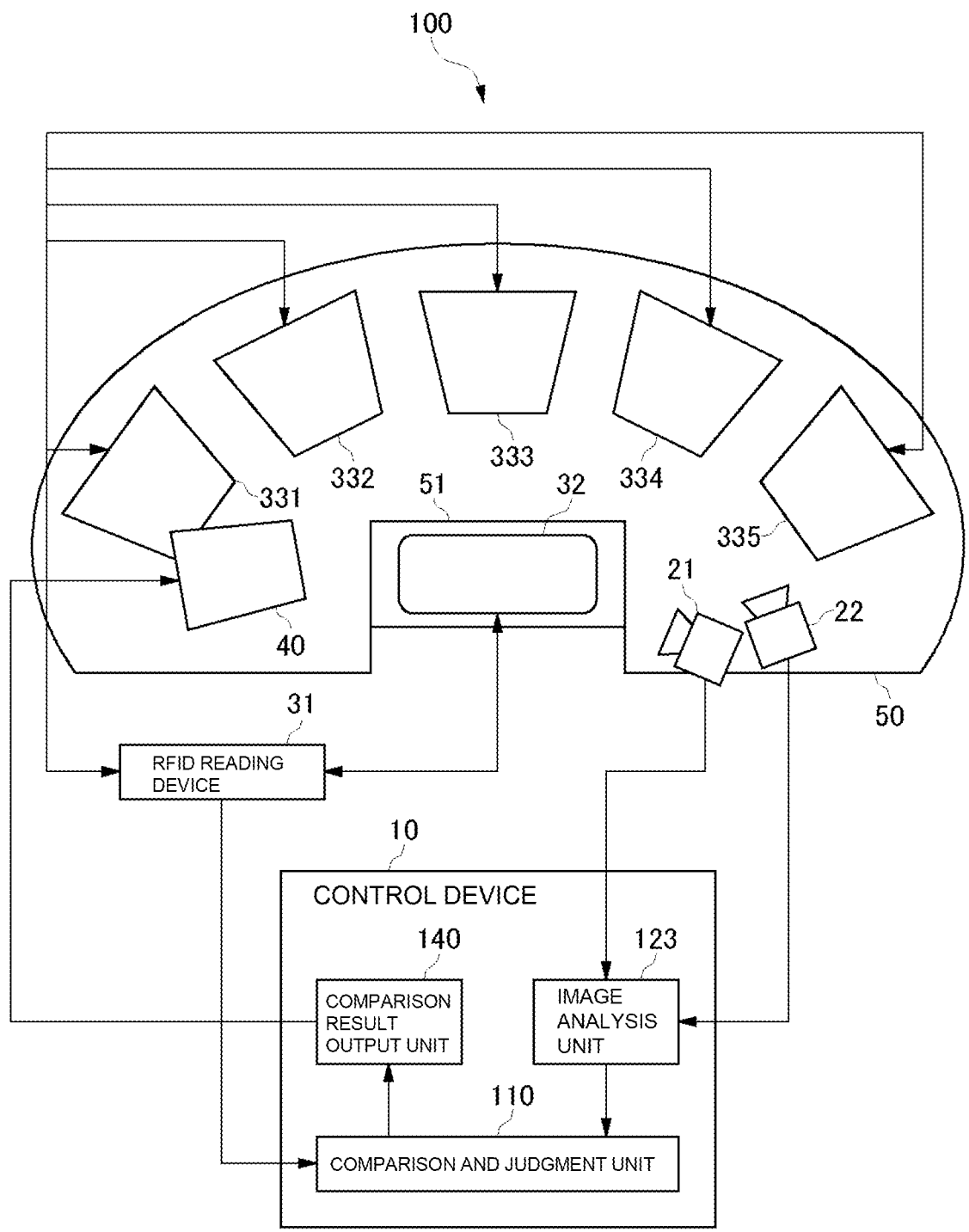
FIG. 5 shows an example of a configuration of the management system of the embodiment.

FIG. 5 shows a configuration of the management system of the embodiment. An antenna 32 is installed on the chip tray 51 of the game table 50, and antennas 331 to 336 are installed for each player position 531 to 536. An RFID reading device 31 is installed to control these antennas 32, 331 to 336. Furthermore, a control device 10 is provided to control the entire management system 100.

The control device 10 is equipped with an image analysis unit 123, a comparison and judgment unit 110, and a comparison result output unit 140. The image analysis unit 123, the comparison and judgment unit 110, and the comparison result output unit 140 may be realized by a general-purpose information processing device executing a specific computer program. This computer program may be provided to the information processing device via a non-transitory computer readable storage medium or via a network and installed in the information processing device.

The image analysis unit 123 receives the captured images generated by the camera 21 and the camera 22, and performs image analysis on them. By performing image analysis on these, it recognizes information on at least the position, type, and side ID of each of the plurality of gaming chips. The image analysis unit 123 performs image recognition by at least partially using a neural network image recognition engine.

For example, in the image captured by the camera 22, since there is a stack of gaming chips at any given location, the image analysis unit 123 first extract a stack of gaming chips (or a single gaming chip) from the captured image using a neural network. The image analysis unit 123 extracts the centerline of each of the plurality of gaming chips from the portion of the extracted stack using another neural network.

The image analysis unit 123 further determines the value of each gaming chip based on the colors above and below the extracted centerline. The image analysis unit 123 further reads the side ID from the center line portion, and in the case of FIG. 3A, the side ID information is obtained by decoding the dot pattern, and in the case of FIG. 3B, the side ID information is obtained by recognizing the numbers.

For images captured by the camera 22, the image analysis unit 123 superimposes the recognized value and side ID information on the captured image as shown in FIG. 4, and output to the comparison and judgment unit 110. In other words, the information on the recognized value and the location of the side ID is expressed by indicating the recognized value and side ID in the captured image.

On the other hand, in the image captured by the camera 21, the relationship in the position and posture between the camera 21 and the chip tray 51 is fixed, and as long as the gaming chips are housed in the columns of the chip tray 51 in an aligned manner, the positions (slots) where the gaming chips can appear in the captured image will be fixed. Therefore, the image analysis unit 123 determines the presence or absence of gaming chips for each slot in the captured image, and for slots where gaming chips are present, extracts the center line in the same manner as above, determines the value, and obtains the side ID.

The same image recognition engine may be used for the image recognition of the image captured by the camera 21 and the image captured by the camera 22, either partially or entirely. In particular, the image recognition engine for extracting the center line, determining the value, and obtaining the side ID described above may be the same image recognition engine that is used for the images captured by camera 21 and camera 22.

Each slot in the image captured by the camera 21 is given an address consisting of a column number and a step number. Therefore, the image analysis unit 123 outputs a recognition list showing the recognized value and side ID for each slot by column number and step number to the comparison and judgment unit 110. The column numbers are assigned as 1, 2, . . . in order starting from the left column, and the step numbers are assigned as 1, 2, . . . in order starting from the bottom.

The RFID reading device 31 controls the antennas 32, 331-336, respectively, at predetermined times or periodically at predetermined time intervals to read the RFID tag. As described above, in the reading of RFID tags by the RFID reading device 31, a plurality of gaming chips can be read at once for each antenna. The RFID reading device 31 outputs the value and unique ID read from the RFID tag to the comparison and judgment unit 110 for each antenna.

It should be noted that the capturing by cameras 21 and 22 and the reading of RFID tags by the RFID reading device 31 are synchronized by the control device 10. However, these do not have to be at exactly the same time. It is sufficient that the same plurality of gaming chips are captured and read at the same time to the extent that there is no movement of the gaming chips.

The comparison and judgment unit 110 obtains information on the position, value, and side ID of each of the plurality of gaming chips from the image analysis unit 123, as well as information on the value and side ID read by each antenna from the RFID reading device 31. The comparison and judgment unit 110 obtains from the image analysis unit 123 the information on the position, value, and side ID of the gaming chips in each betting area associated with the images captured by the camera 22, as well as the information on the position, value, and side ID of the gaming chips in the chip tray 51 obtained from the images captured by the camera 21.

The comparison and judgment unit 110 obtains from the RFID reading device 31 the value and unique ID information of the plurality of gaming chips read in each of the chip tray 31 and betting areas 331 to 336, respectively.

The comparison and judgment unit 110 compares the plurality of unique IDs obtained by the RFID reading device 31 (hereinafter referred to as the "first unique ID group") and the plurality of unique IDs obtained by the camera 21 and the image analysis unit 123 (hereinafter referred to as the "second unique ID group") for the plurality of gaming chips in the chip tray 31. The comparison and judgment unit 110 identifies a unique ID among the unique IDs of the second unique ID group that do not have a corresponding unique ID in the first unique ID group. In other words, the comparison and judgment unit 110 extracts a unique ID from the plurality of unique IDs in the second unique ID group that do not correspond to any of the unique IDs in the first unique ID group.

If the RFIDs of all the gaming chips are normal, there will be no such unique IDs, but if there is a gaming chip of which RFID is fraudulent (the correct unique ID is not recorded, or the RFID tag itself does not exist, etc.), the unique ID of the problem gaming chip will be identified in the second unique ID group. Since each unique ID in the second unique ID group has information on its location (column number and step number), the comparison and judgment section 110 identifies the location of the problem gaming chip.

Figure 6:
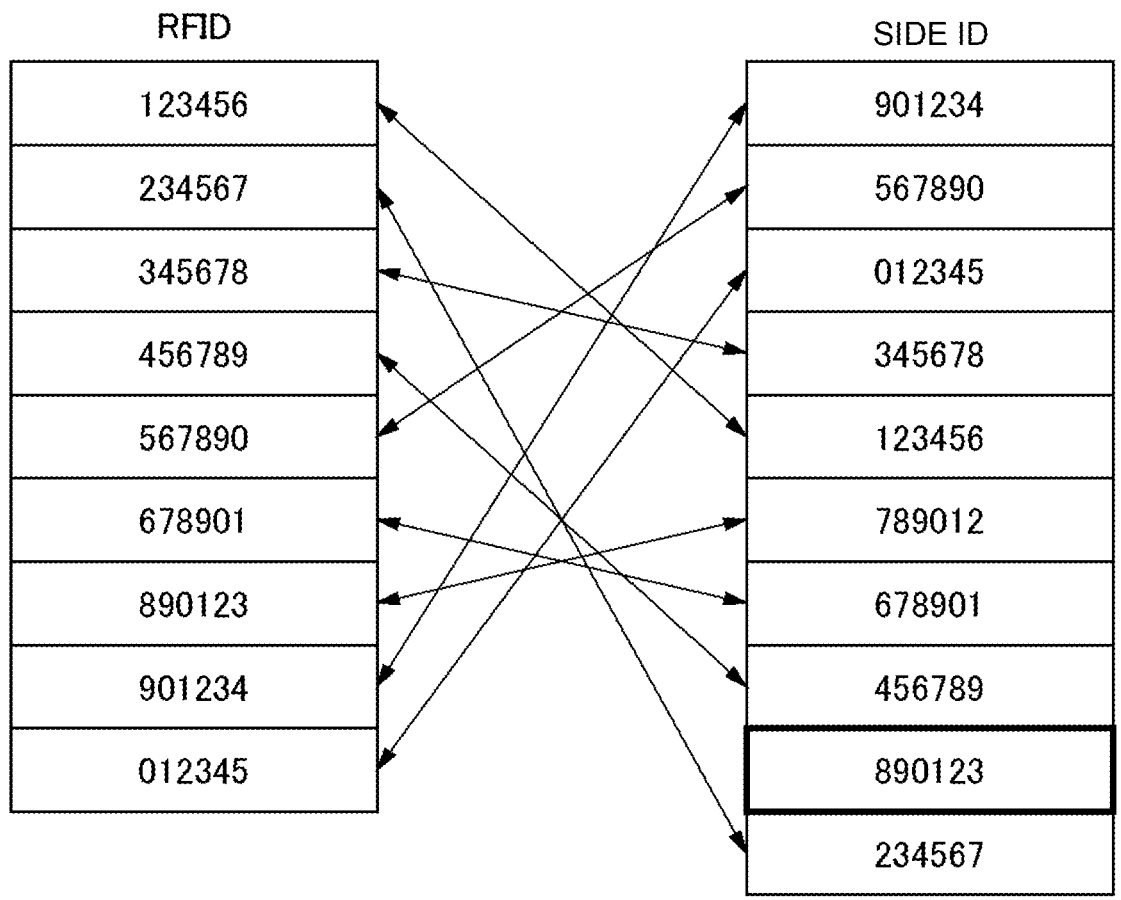
FIG. 6 shows the process of comparison and judgment by the comparison and judgment unit of the embodiment.

FIG. 6 shows the process of comparison and judgment by the comparison and judgment unit 110. FIG. 6 shows an example in which the unique ID stored in the RFID tag and the unique ID of the side ID are the same for the same gaming chip. In this example, the unique ID "890123" in the second unique ID group obtained from the side ID does not have a corresponding unique ID in the first unique ID group. Therefore, it can be determined that this gaming chip is a problem gaming chip that has a problem with RFID.

Since the unique ID is associated with the position information (column number and step number), the comparison and judgment unit 110 can identify the position of the problem gaming chip. The comparison and judgment unit 110 outputs the information on the location of the problem gaming chip to the comparison result output unit 140. The comparison result output unit 140 uses the position information obtained from the comparison and judgment unit 110 to generate a monitor screen showing the position.

Figure 7:
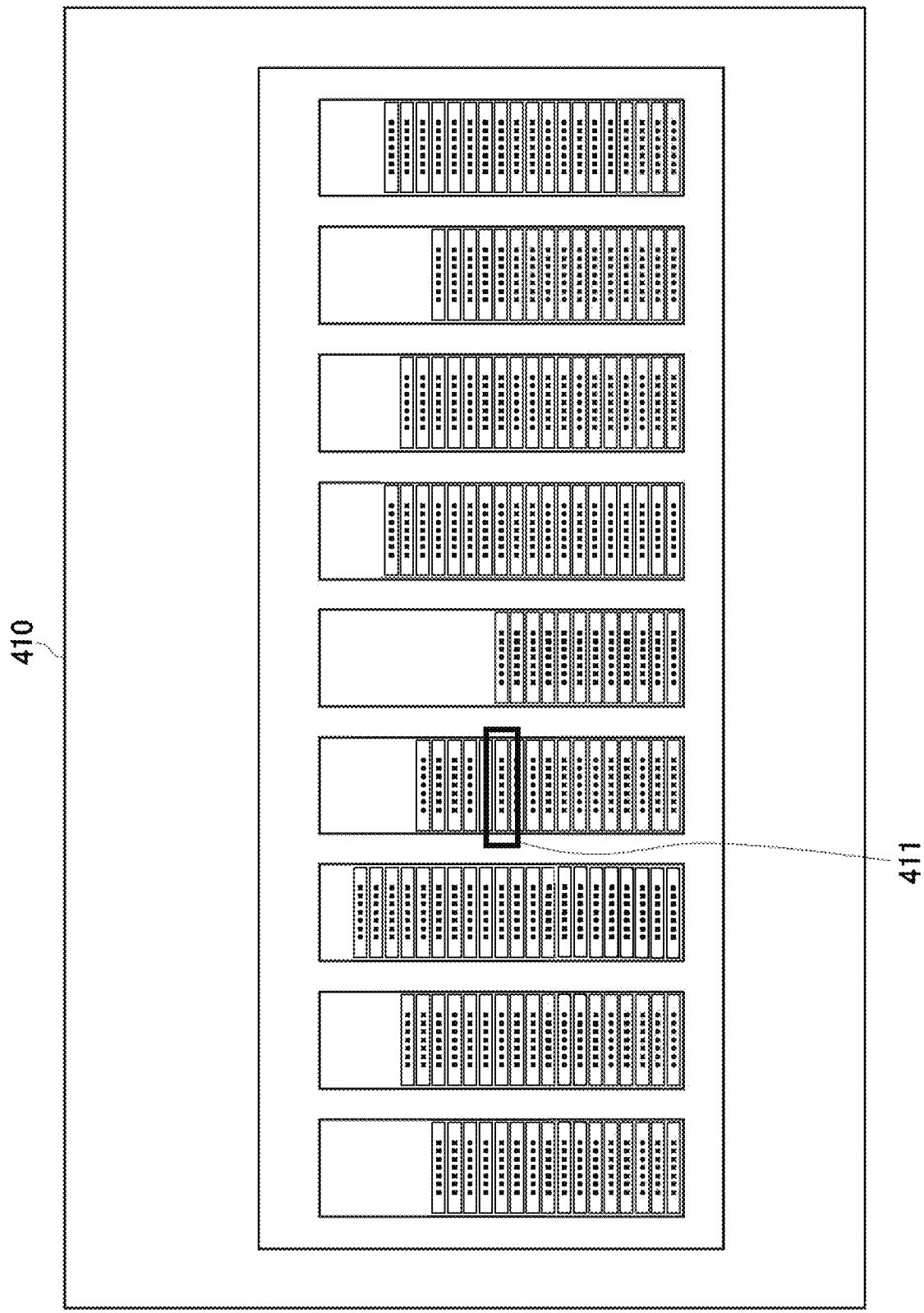
FIG. 7 shows an example of the monitor screen of the embodiment.

FIG. 7 shows an example of a monitor screen generated in the comparison result output unit 140. The comparison result output unit 140 generates a monitor screen 410 showing the position of the problem gaming chip. The monitor screen 410 is a screen on which a mark 411 indicating that the chip is a problem gaming chip is superimposed at a position in accordance with position information of the problem gaming chip on the image obtained by image processing such as trapezoidal correction on the image captured by the camera 21.

In the example shown in FIG. 7, the monitor screen is generated by superimposing the mark on the captured image generated by the camera 21. However, instead of this, the monitor screen showing the position of the problem gaming chip may be generated by placing a mark on the position of the problem gaming chip in the pre-prepared image of the chip tray (real photo or computer graphics image). In the case of using computer graphics, to indicate the position of the problem gaming chip, the computer graphics may draw all the recognized gaming chips in the positions corresponding to the actual chips, and then draw marks on the problem gaming chips among them.

The comparison judgment unit 110 compares a plurality of unique IDs obtained by the RFID reading device 31 (the first unique ID group) and the plurality of unique IDs obtained by the camera 22 and the image analysis unit 123 (the second unique ID group) for the plurality of gaming chips in the plurality of betting areas, for each betting area. The comparison judgment unit 110 identifies, for each betting area, among the unique IDs of the second unique ID group, a unique ID that does not have a corresponding unique ID in the first unique ID group, i.e., a unique ID that does not correspond to any of the unique IDs of the first unique ID group.

If the RFIDs of all the gaming chips are normal, there will be no such unique IDs. If there is a problem gaming chip, the unique ID of the problem gaming chip is identified from the second unique ID group. The comparison and judgment unit 110 outputs the information of the identified problem gaming chip to the comparison result output unit 140.

Figure 8:
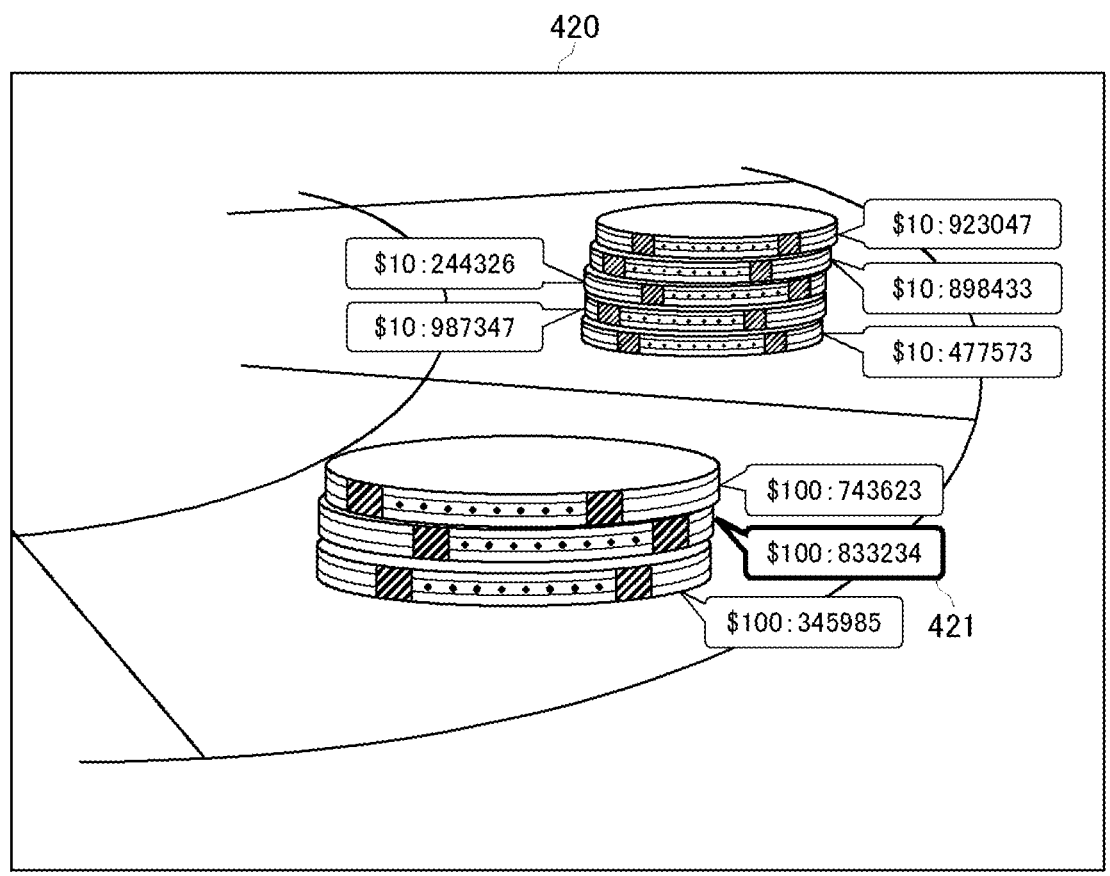
FIG. 8 shows another example of the monitor screen of the embodiment.

FIG. 8 shows an example of a monitor screen generated by the comparison result output unit 140. Since each unique ID of the second unique ID group is superimposed on the captured image, the comparison result output unit 140 generates a monitor screen 420 with the unique IDs superimposed on the captured image marked. In the example of FIG. 8, the unique ID "833234" is a unique ID that does not exist in the first unique ID group, so the frame 421 indicating this unique ID is bolded in the monitor screen 420.

The monitor 40 displays the monitor screen 410 and the monitor screen 420 generated by the comparison result output section 140. By checking this monitor screen 410 and 420, the dealer D can determine which of the actual gaming chips in the chip tray 51 and betting areas 531 to 536 are the problem gaming chips.

In the case that the first unique ID group obtained by the RFID reading device 31 and the second unique ID group obtained by the camera 22 and the image analysis unit 123 do not correspond to each other, but the number of unique IDs in the first unique ID group and the number of unique IDs in the second unique ID group are the same, the problem gaming chip that is causing such inconsistency is identified by the monitor screen. This identified problem gaming chip has a unique ID stored in its RFID tag and a side ID written on its side, but which of these is correct can be determined by identifying the unique ID printed on the capsule built into this problem gaming chip. By obtaining the unique ID printed on the capsule, the comparison result output unit 140 determines which of the unique ID stored in the RFID tag and the side ID written on the side is correct and which is incorrect.

(Second Embodiment) In the above embodiment, unique IDs are recorded by way of the RFID tag and the side ID, respectively, and by comparing the first unique ID group obtained from the RFID tags and the second unique ID group obtained from the side IDs, the comparison and judgment unit 140 can determine the unique IDs that do not correspond to each other, especially a unique ID in the second unique ID group which does not have a corresponding unique ID in the first unique ID group. In this embodiment, a problem gaming chip is identified when information on the group (type) to which the gaming chip belongs is recorded by way of the side ID.

In other words, in this embodiment, the side ID of a certain gaming chip overlaps with some other gaming chips in a plurality of gaming chips. Such a side ID is typically information on the value of the gaming chip. For example, the value of a gaming chip may be $10, $50, $100, $1000, etc. The image analysis unit 123 identifies the group (value) of each gaming chip by analyzing the side IDs based on the captured images.

Figure 9:
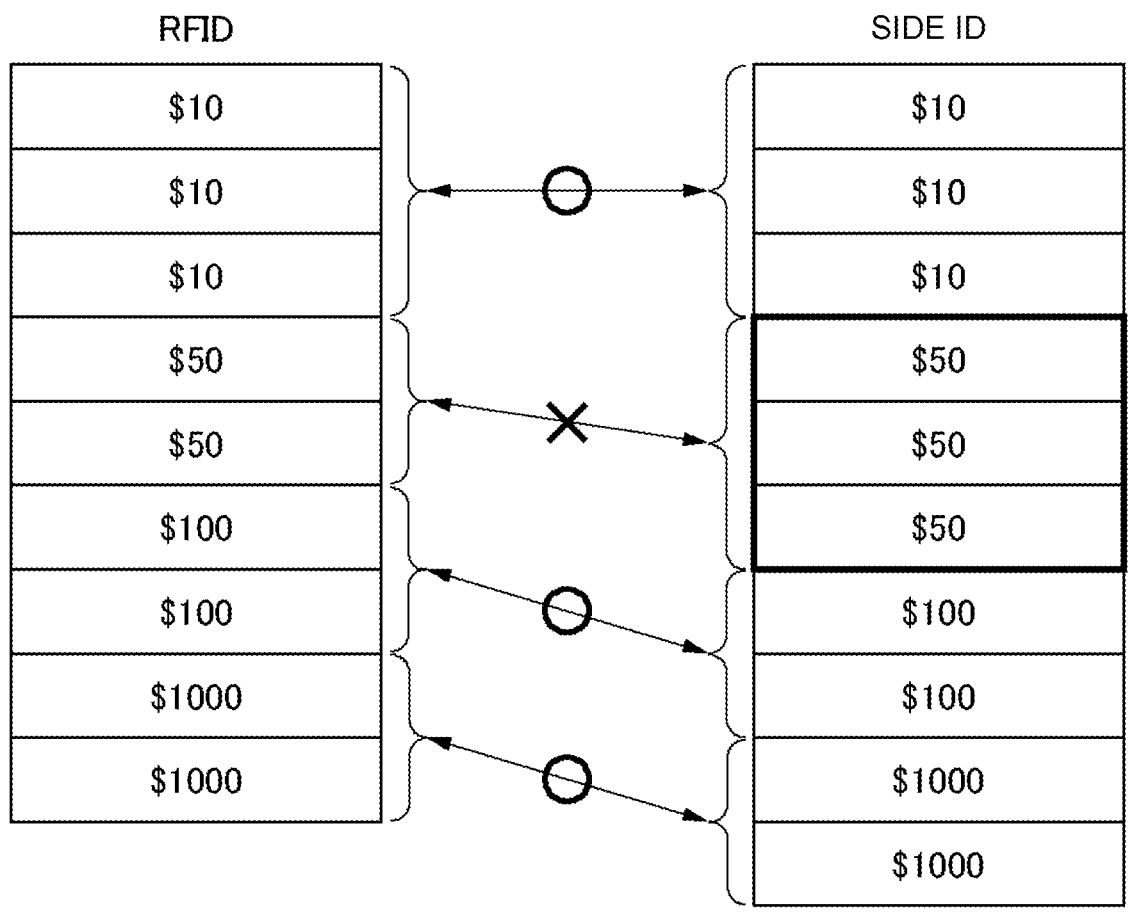
FIG. 9 shows the process of comparison and judgment by the comparison and judgment unit of the embodiment.

FIG. 9 shows a process of the comparison and judgment unit 110 in this embodiment. In the example of FIG. 9, information indicating three $10 chips, two $50 chips, two $100 chips, and two $1,000 chips are obtained from the RFID reading device 31. On the other hand, three $10 chips, three $50 chips, two $100 chips, and two $1,000 chips together with the location information thereof are obtained from the image analysis unit 123.

In this way, the information of the same group is obtained in the comparison and judgment unit 110, but in the example of FIG. 9, the number of side IDs (3) in the $50 group is greater than the number of RFIDs (2) in the $50 group. In such a case, the comparison and judgment unit 110 identifies all the gaming chips whose side ID is $50 as problem gaming chips, and identifies the location of each such problem gaming chip.

In fact, not all of the three $50 chips identified by the side IDs are problem gaming chips, but some of them are problem gaming chips. Therefore, in this embodiment, all of these gaming chips with a possibility of problem are treated as problem gaming chips, and their locations are identified.

The comparison and judgment unit 110 outputs the information of the group of problem gaming chips (the information of $50 in the example of FIG. 9) to the comparison result output unit 140. The comparison result output unit 140 generates a monitor screen showing the positions of the problem gaming chips based on this information. In this monitor screen, all gaming chips belonging to the group may be individually marked as in the first embodiment, or, if the gaming chips of the group are adjacent to each other, a mark may be attached to the area where the gaming chips of the group are located. For example, if there are a stack of $100 chips and a stack of $10 chips as shown in FIG. 4, the stack with the problem gaming chips may be marked.

Figure 10:
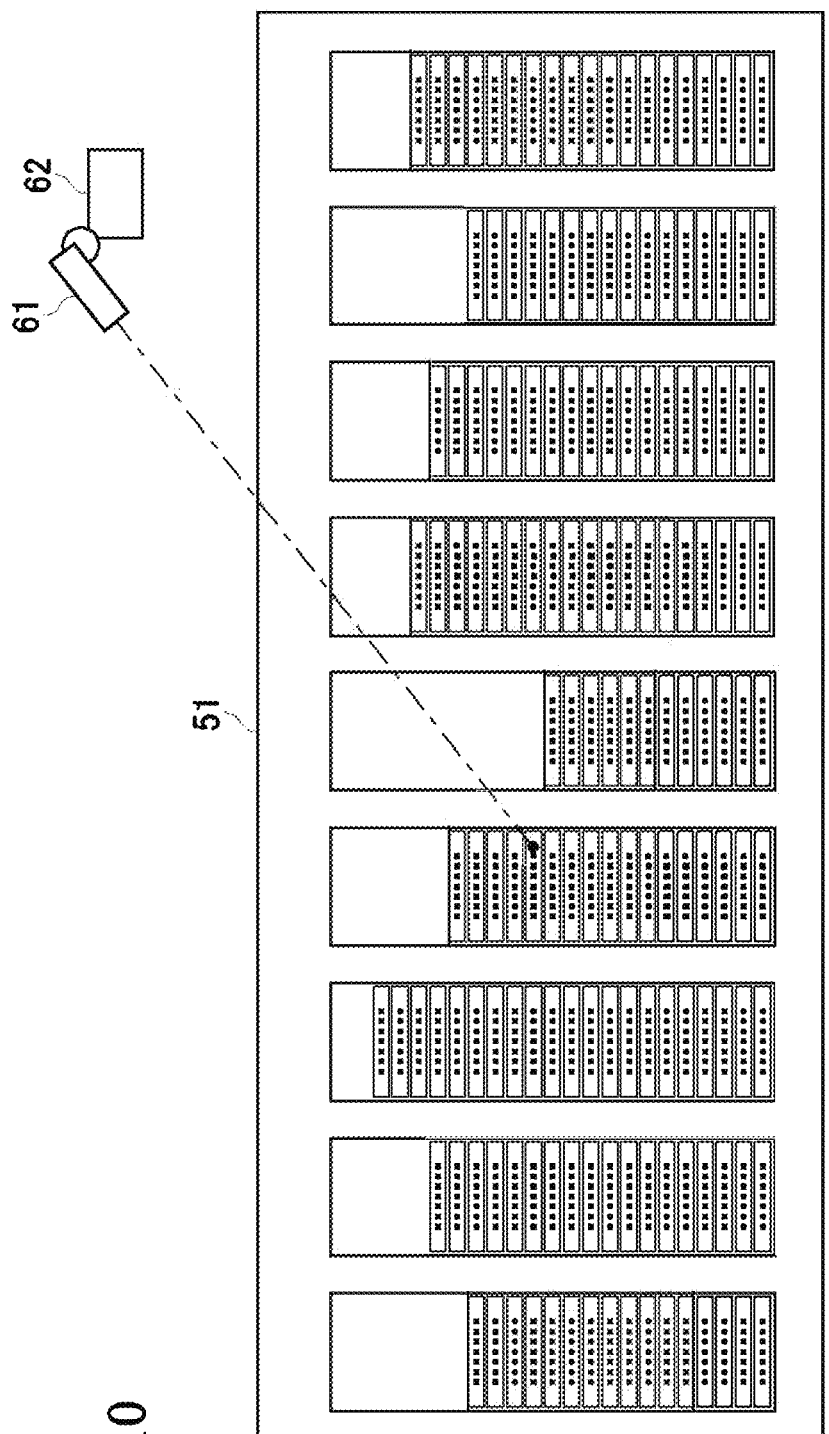
FIG. 10 shows an example a configuration of a management system of another embodiment.

(Other Embodiments) FIG. 10 shows another example of a management system. In this example, the game table is provided with a laser pointer 61 that emits a laser beam toward the chip tray 51. The laser pointer 61 is driven by a drive unit 62 to change the direction of irradiation of the laser beam.

When the comparison result output unit 140 obtains information on the position of the problem gaming chip from the comparison and judgment unit 110, it generates a drive signal to irradiate the laser beam from the laser pointer 61 to the position of the problem gaming chip and sends the drive signal to the drive unit 62. The drive unit 62 drives the laser pointer 61 to change the direction of the laser beam according to the drive signal.

In addition, the device that irradiates the light to the problem gaming chip is not limited to the laser pointer 61, but may be any other light-irradiating device.

Figure 11:
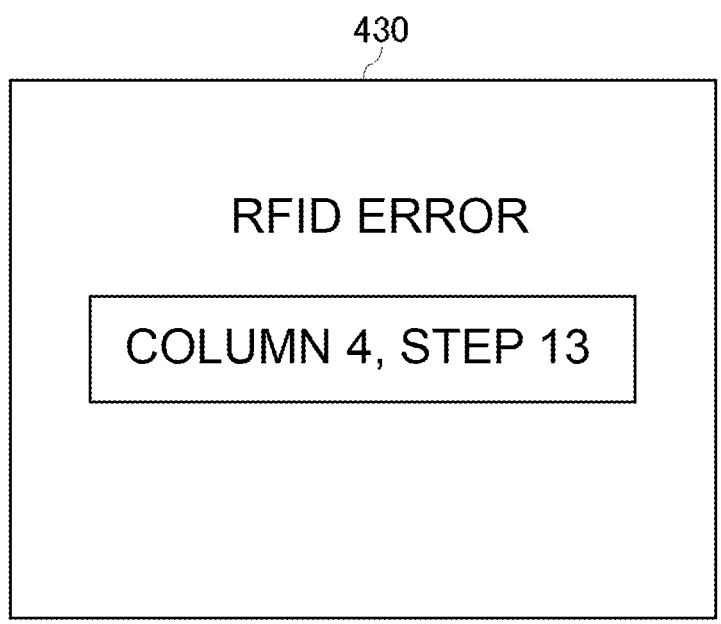
FIG. 11 shows another example of the monitor screen of the system.

FIG. 11 shows another example of a monitor screen. In the monitor screen 430, the address (slot) of the location of the problem gaming chip obtained by the comparison and judgment unit 110 is indicated by characters representing the column number and the step number. In the example of FIG. 11, the column number of the problem gaming chip is "4" and the step number is "13." Such a monitor screen 430 allows the dealer to identify which of the plurality of actual gaming chips in the chip tray 51 is a problem gaming chip.

Figure 12:
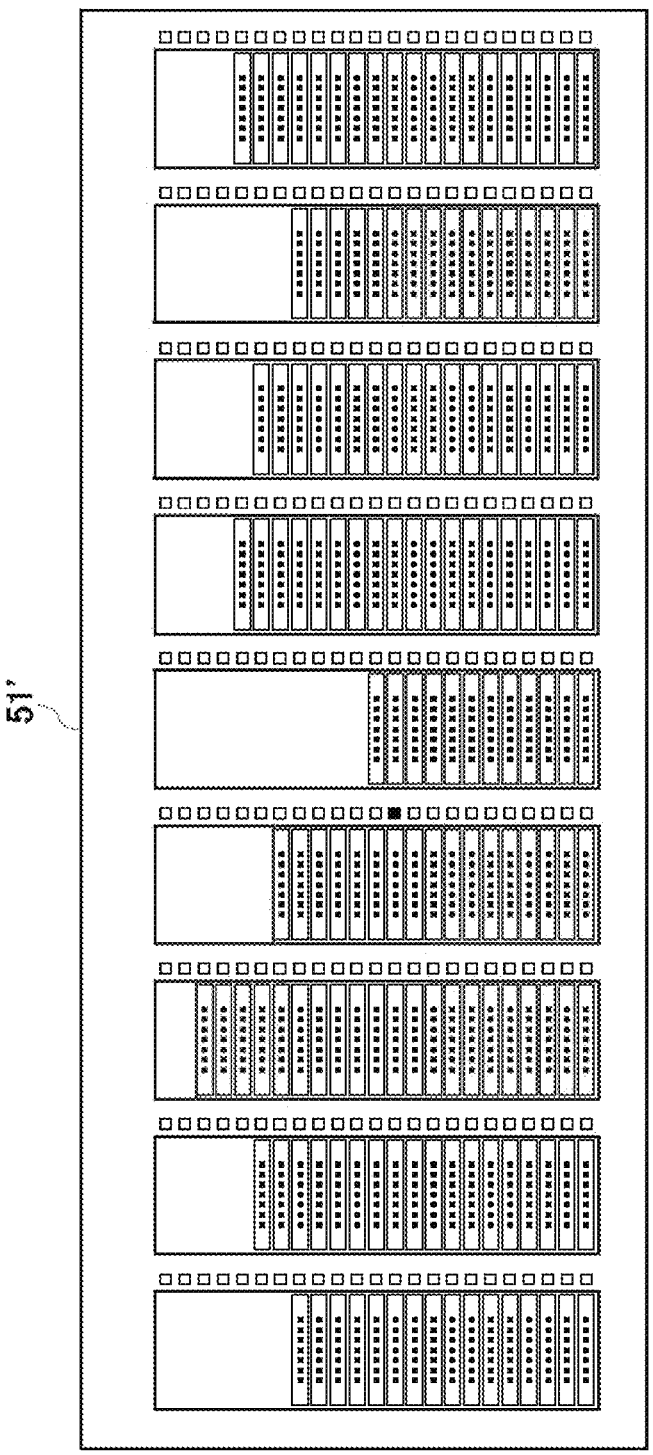
FIG. 12 shows an example of a management system of another embodiment.

FIG. 12 shows yet another example of a management system. In this example, indicator lights are provided in each slot of the chip tray 51'. These indicator lights are turned on and off by a driving device not shown in the figure. The comparison result output unit 140 outputs information on the address of the problem gaming chip to the driving device. The driving device drives the indicator lights so that only the indicator light of the address designated by the comparison result output unit 140 is turned on.

According to this example, the dealer D can identify the location of the problem gaming chips by viewing the points of the indicator lights provided on the chip tray 51'.

Figure 13:
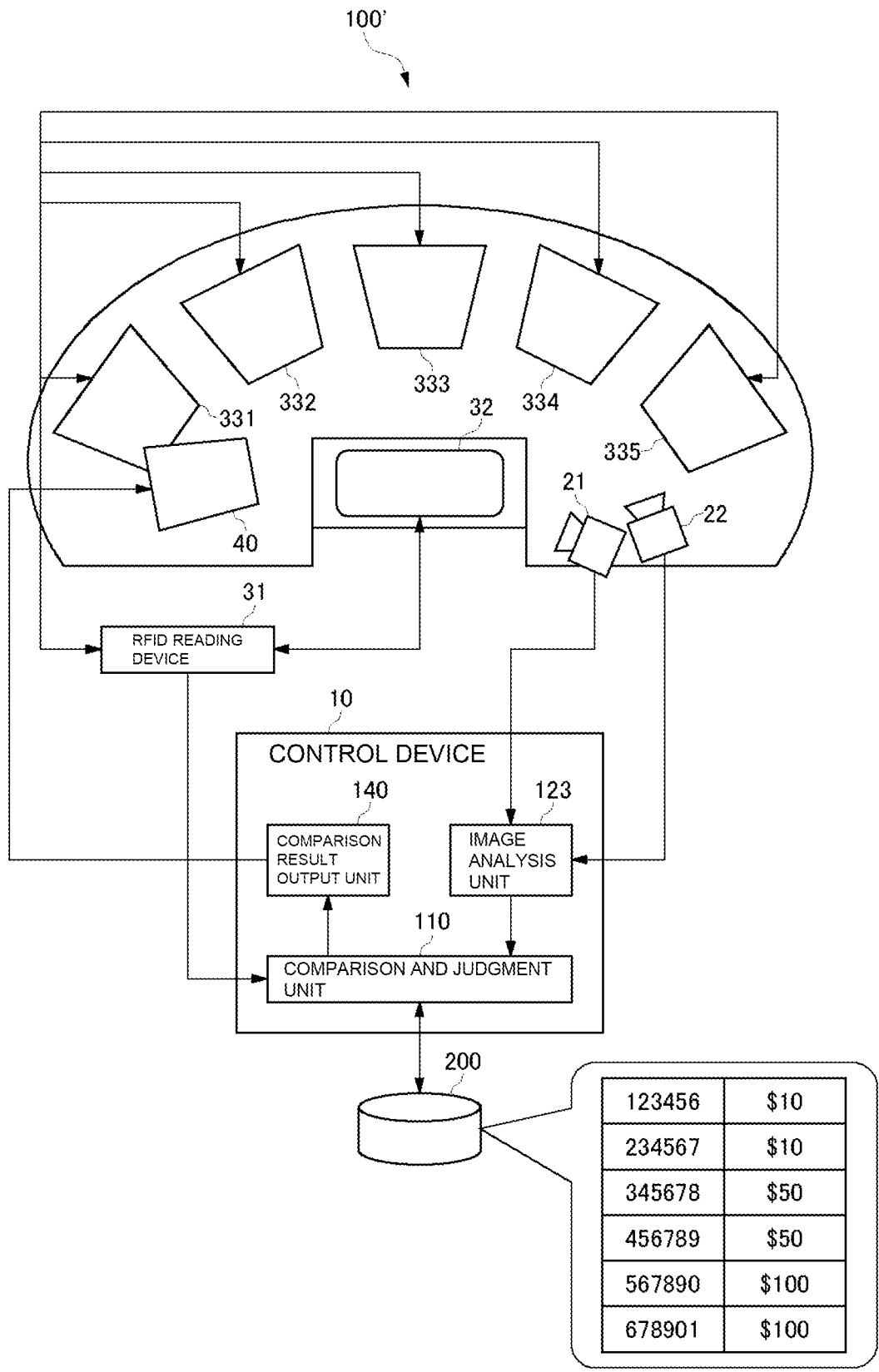
FIG. 13 shows an example a configuration of a management system of another embodiment.

FIG. 13 shows a configuration of a management system of another embodiment. In this example, a unique ID is recorded in the RFID tag, and the side ID represents the information of value. In a management system 100', a database 200 is provided. In the database 200, for each gaming chip, the unique ID and the value are associated and stored.

The comparison and judgment unit 110 can obtain information on the corresponding value by referring to the database 200 for the unique ID obtained from the RFID reading device 31. In addition, the comparison and judgment unit 110 can obtain information on the value represented by the side ID and information on its location from the image analysis unit 123. This allows the location of the plurality of problem gaming chips to be identified by the same method described with FIG. 9 above.

In the above example, it has been explained that the location of problem gaming chips that have problems with RFID is identified, but conversely, there may be a situation where the RFID tag can be read but the corresponding side ID cannot be obtained. In other words, if the RFID and side ID are unique IDs (see FIG. 6), it is possible that a unique ID that does not have a corresponding unique ID in the second unique ID group is included in the unique IDs of the first unique ID group. For example, there could be a case that the side IDs could not be obtained from the captured images by image analysis.

In such a case, the comparison and judgment unit 110 detects the existence of such a gaming chip and reports it to the comparison result output unit 140. The comparison result output unit 140 receives the report, and generates a monitor screen indicating the existence of such a gaming chip, and the monitor 40 displays the monitor screen.

When the comparison and judgment unit 110 compares the information of the group to which the gaming chip belongs (see FIG. 9), it is also possible that the number of RFIDs read by the RFID reading device 31 is greater than the number of side IDs. For example, it is found that there are three $50 chips by way of RFID, while only two $50 chips are recognized from the side IDs. In this case, since it is possible to identify the group (e.g., $50) in which such a problem occurs, the comparison result output unit 140 may generate a monitor screen indicating the location or area of the group.

In the above embodiment, though the side ID was information that represents a unique ID or information that represents a type (value), for example, the side ID may be a unique ID among chips of the same value, allowing gaming chips of different values to have the same ID. In this case, the image analysis unit 123 can uniquely identify the gaming chip by determining the value based on the colors of the first and third layers of the side of the gaming chip (i.e., information other than the side ID ascertained from the image) and recognizing the side ID.

In this case, the database 200 stores the RFID, the side ID, and the value information associated with each other for each gaming chip. By referring to the database 200, the comparison and judgment unit 110 can identify the unique ID corresponding to the combination of the side ID and the value, and compares the identified unique ID and unique IDs read from the RFID tags.

In addition, in the above embodiment, when the side IDs are duplicated for some of a plurality of gaming chips, as shown in FIG. 9, it was not possible to identify a single problem gaming chip even though it is known that one problem gaming chip exists, and therefore all the gaming chips that may have a problem are treated as the problem gaming chips, however, by judging the value based on the color of the first and third layers of the side of the gaming chip, the number of the problem gaming chips can be narrowed down.

For example, in the case where the side ID represents one of 256 different identification numbers by using eight dots, the RFID tag stores the same identification number as the side ID, and the value of the gaming chip is also stored in the RFID tag, when the number (e.g., two) of identification number (e.g., "012") read from the RFID tag is less than the number (e.g., three) of identification number (e.g., "012") read from the side ID, then all the three gaming chips with such an identification number result in being identified as the problem gaming chips, according to the above embodiment.

Therefore, the comparison and judgment unit 110 also refers to the information on the value of the gaming chip determined in the image analysis unit 123 to reduce the number of gaming chips that are considered to be the problem gaming chips due to the possibility of problem. For example, if values of two gaming chips with the identification number "012" read from the RFID tag are $10 and $100, and the image analysis unit 123 determines the value of the three gaming chips with identification number "012" as $10, $50, and $100 based on the colors of the first and third layers, the comparison and judgment unit 110 determines the gaming chip with value of $50 among the three gaming chips has a problem with RFID.

The comparison and judgment unit 110 can thus reduce the number of candidates for the problem gaming chips or identify the problem gaming chip uniquely as described above, in the case where the side IDs are allowed to overlap with the side IDs of other gaming chips.

In this example, the same identification number may be duplicated in a plurality of gaming chips of the same value. For example, any of the identification numbers "001" through "256" may be assigned to multiple gaming chips of the same value, resulting in the chip tray may contain several or so gaming chips of the same value and the same identification number. In this case as well, it is possible to narrow down the candidates for problem gaming chips according to their value, and if there are still multiple potentially problem gaming chips, all such chips should be treated as problem gaming chips, the locations of those gaming chips are identified and presented to the dealer.

In the case that the side ID is not completely readable or it is determined that there is a problem gaming chip, the side ID may be determined using information on the value of the gaming chip. For example, there is a $10 chip with a side ID of "120" and a $100 chip with a side ID of "121" and there are no gaming chips with side IDs of "122" to "129", then the side ID is read as "12X" ("X" is indeterminate) and the value is determined to be $10, the comparison and judgment unit 110 determines that the side ID of this gaming chip is "120" and compares this side ID with the RFID.

In addition, when a problem gaming chip whose side ID does not correspond to the RFID is detected, the value information is used to determine which of the side ID and the unique ID is wrong. In this case, the side ID, the RFID and the value information are stored in association with each other for each gaming chip in the database 200. When, in the database 200, the value associated with the side ID that does not have a corresponding unique ID in the first unique ID group read from the RFID tags matches the value determined by the image analysis unit 123 for the gaming chip that has the side ID, the comparison and judgment unit 110 shall determine that the side ID is correct and the RFID is wrong. In addition, when, in the database 200, the value associated with the RFID that does not have the corresponding side ID in the second unique ID group matches the value determined by the image analysis unit 123 for the gaming chip that has the side ID, the comparison and judgment section 123 shall determine that the RFID is correct and the side ID is wrong.

In addition, although the above embodiment identifies the location of a problem gaming chip, the above configuration of the management system 100 can also be used to specify any specific unique ID and identify the location of the gaming chip having such unique ID. Specifically, in such a management system, if there is a specific unique ID among the unique IDs (first unique ID group) of the plurality of gaming chips acquired by the RFID reading device 31, the position of the gaming chip having the side ID corresponding to the unique ID is identified.

In the above embodiment, although a system for managing gaming chips at a game table is described, the management system may be applied to places other than game tables. For example, the management system may be applied to backyards, cages, etc. of casinos.

In addition, although the above embodiment describes a system for managing gaming chips, the management system can be applied to other gaming products that can incorporate RFID.

In the above embodiment, although the camera 21 that captures the gaming chips contained in the chip tray 51, the camera 22 that captures the gaming chips bet on the betting area 531 to 536, and the monitor 40 that displays information to the dealer were fixed to the game table 51 respectively, it is not necessary for some or all of these cameras 21, 22, and the monitor 40 to be fixed to the table. For example, the camera 22 and the monitor 40 may be implemented in a hand-held information processing terminal such as a tablet computer or a smart phone.

For example, if the information processing terminal is a tablet computer, the camera 22 is installed on the back of the tablet computer and the surface is the monitor 40 as a touch panel. This tablet computer is wired or wirelessly connected to the control device 10. Even the various functions of the control device 10 may be implemented in the tablet computer. In this case, the tablet computer may be wired or wirelessly connected to the RFID reading device 31.

When the dealer or casino staff holds the tablet computer over the chip tray 51 and points the camera 22 at the chip tray 51, the captured image of the chip tray 51 and the gaming chips contained therein is displayed on the monitor 40. The image analysis unit 123 analyzes the captured image, and the comparison and judgment unit 110 compares the information read by the RFID reading device 31 with the information recognized by the image analysis unit 123. The comparison result output unit 140 generates a display image by superimposing the result of the comparison on the captured image and outputs it to the monitor 40.

With this configuration, the comparison result is displayed on the touch panel of the tablet computer. The image capture may be performed in response to the operation to a capture button, or it may be performed continuously. In the case of continuous image capture, the screen on which the comparison results are superimposed will be displayed on the monitor 40 in real time.

In addition, in the above embodiment, a gaming chip having a unique ID which is obtained by image analysis by the image analysis unit 123 but not obtained by the RFID reading device 31 was determined to be a problem gaming chip. If the gaming chip does not have a built-in RFID tag or if the RFID tag built into the gaming chip is broken, the unique ID cannot be read by the RFID reading device, however, due to the way the gaming chip is placed, deterioration or partial failure of the RFID, the reading of the RFID by the antennas 32, 331 to 335 and RFID reading device 31 may not be stable.

The RFID reading device 31 may read the RFID tag repeatedly at predetermined time intervals. If the reading is unstable, the unique ID may or may not be read from the RFID tag in the repeated readings. In this case, the comparison and judgment unit 110 may treat the gaming chip whose unique ID is read at least once as the normal gaming chip, or it may treat a gaming chip having such a unique ID that is unstable to read as a problem gaming chip. In addition, the comparison and judgment unit 110 and the comparison result output unit 140 may treat a gaming chip with a unique ID that is unstable in reading as a problem gaming chip, and distinguish between a gaming chip whose unique ID cannot be read completely and a gaming chip whose unique ID is unstable in reading to output the comparison result.

When a single antenna is used to read the RFID tags of a large number of gaming chips, unstable reading as described above may occur. According to the above example, it is possible to identify gaming chips with RFID tags with unstable readings from among a large number of gaming chips.

DESCRIPTION OF THE REFERENCES

- 10 Control device
- 21 Camera
- 22 Camera
- 31 RFID reading device
- 32, 331 to 336 Antenna
- 40 Monitor
- 50 Game table
- 51 Chip tray
- 52 Electronic shoe
- 100 Management system
- 110 Comparison and judgment unit
- 123 Image analysis unit
- 140 Comparison result output unit
- 200 Data base
- 531 to 536 Player position
- C Gaming chip
- D Dealer
- P Player

The invention claimed is:

1. A management system comprising:
   an image capturing device configured to capture an image of one or more gaming chips, wherein each gaming chip has a built-in RFID tag storing a first information and has a second information written on a surface thereof to be displayed on the image, wherein the second information is unique for each gaming chip;
   a reading device configured to read RFID tags of the one or more gaming chips to obtain the first information of the one or more gaming chips;
   an image analysis device configured to obtain a location of each of the one or more gaming chips and the second information of each of the one or more gaming chips, based on the image; and
   a control device configured to identify a location of a problem gaming chip whose RFID tag is fraudulent or damaged, or whose notation is fraudulent, by comparing, for each gaming chip, the first information of the gaming chip obtained by the reading device with the second information of the gaming chip obtained by the image analysis device.

2. The management system according to claim 1, wherein the control device is configured to identify the location of the problem gaming chip by identifying a gaming chip having a second information not corresponding to a first information as the problem gaming chip.

3. The management system according to claim 1, wherein the control device is configured to identify the location of the problem gaming chip by identifying a gaming chip having a second information, for which a corresponding first information is not obtained, as the problem gaming chip.

4. The management system according to claim 1, wherein the control device is configured to identify the location of the problem gaming chip by identifying a gaming chip having an RFID tag in which a first information not corresponding to a second information is stored as the problem gaming chip.

5. The management system according to claim 1, wherein the control device is configured to identify the location of the problem gaming chip by identifying a gaming chip having an RFID tag in which a first information is stored for which a corresponding second information is not obtained as the problem gaming chip.

6. The management system according to claim 1, wherein the control device is configured to use information other than a first information and a second information of the problem gaming chip to determine whether the problem is in the RFID tag or the notation.

7. The management system according to claim 6, wherein each of the one or more gaming chips have an appearance that enables identification of a respective type of the gaming chip, among one or more types of gaming chips,
   the image analysis device is configured to determine the type of each of the one or more gaming chips based on the image, and
   the control device is configured to determine which of the RFID tag and the notation is wrong based on the type determined by the image analysis device.

8. The management system according to claim 1, wherein each of the one or more gaming chips have an appearance that enables identification of a respective type of the gaming chip, among one or more types of gaming chips,
   the second information is unique for each of the types,
   the image analysis device is configured to obtain the second information and determine the type for each of the one or more gaming chips based on the image, and
   the control device is configured to compare the first information of each gaming chip with a combination of the second information and information of the type of the gaming chip.

9. The management system according to claim 1, wherein each of the one or more gaming chips have an appearance that enables identification of a type of the gaming chip,
   the image analysis device is configured to, for each of the one or more gaming chips:
     obtain the second information of the gaming chip, and
     determine the type of the gaming chip based on the image of the gaming chip, and
   the control device is configured to, in the case where a second information of a gaming chip of the one or more gaming chips cannot be read, or in the case where it is determined that the gaming chip is the problem gaming chip;
     identify the second information of the gaming chip using information of a type of the gaming chip determined by the image analysis device and compare the identified second information with a first information of the gaming chip.

10. The management system according to claim 7, wherein the appearance enabling identification of the type of the gaming chip is on a side of the gaming chip.

11. The management system according to claim 1, further comprising a housing unit configured to accommodate the one or more gaming chips, wherein the imaging capturing device is configured to capture the one or more gaming chips accommodated in the housing unit.

12. The management system according to claim 11, wherein the housing unit is configured to accommodate the one or more gaming chips in an aligned manner.

13. The management system according to claim 11, wherein the housing unit is a chip tray provided on a game table.

14. The management system according to claim 13, wherein the image capturing device is fixed to the game table.

15. The management system according to claim 1, wherein, for each gaming chip, the second information of the gaming chip is written on the side of the gaming chip.

16. The management system according to claim 1, wherein the second information of the gaming chip is information represented by a matrix pattern, a dot pattern, a barcode, a sequence of numbers, or a sequence of letters, and
the image analysis device is configured to obtain the second information by decoding the matrix pattern, the dot pattern, or the barcode, or by recognizing the sequence of numbers or the sequence of letters.

17. The management system according to claim 1, wherein, for each gaming chip, the first information of the gaming chip is a unique ID that uniquely identifies the gaming chip.

18. The management system according to claim 17, wherein, for each gaming chip, the second information of the gaming chip is the same unique ID as the first information of the gaming chip.

19. The management system according to claim 1, wherein the first information and the second information of the gaming chip are different information from each other,
the management system further comprises a database that records a combination of the first information and the second information for each gaming chip, and
the control device is configured to perform the comparison by referring to the database.

20. The management system according to claim 1, wherein a second information of a gaming chip of the one or more gaming chips is duplicated as the second information for at least one other gaming chip of the one or more gaming chips, and
the control device is configured to, when a plurality of identical second information is obtained, and the number of the identical second information is greater than the number of first information corresponding to the identical second information,
determine a plurality of the gaming chips on which the identical second information are represented as problem gaming chips, and
identify each of the locations of the plurality of problem gaming chips.

21. The management system according to claim 1, wherein a second information of a gaming chip of the one or more gaming chips is duplicated as the second information for at least one other gaming chip of the one or more gaming chips, and
the control device is configured to, when a plurality of identical second information is obtained, and the number of the identical second information is greater than the number of first information corresponding to the identical second information,
determine a plurality of the gaming chips on which the identical second information are represented as problem gaming chips, and
identify an area of the plurality of problem gaming chips.

22. The management system according to claim 1, wherein a second information of a gaming chip of the one or more gaming chips is duplicated as the second information for at least one other gaming chip of the one or more gaming chips, and
the control device is configured to, when there is a plurality of candidates for a first information for which a corresponding second information is not obtained, identify the plurality of candidates for the first information.

23. The management system according to claim 1, further comprising a display device configured to indicate the location of the problem gaming chip.

24. The management system according to claim 23, wherein the display device is configured to superimpose the location on the image.

25. The management system according to claim 23, wherein the management system further comprises a housing unit capable of accommodating the one or more gaming chips in a predetermined accommodating position,
the image capturing device is configured to capture the one or more gaming chips accommodated in the housing unit, and
the display device is configured to display an address of the accommodating position of the problem gaming chip in the housing unit.

26. The management system according to claim 1, further comprising:
a housing unit capable of accommodating the one or more gaming chips in an aligned manner; and
a light irradiation device configured to irradiate light to a designated gaming chip among the one or more gaming chips accommodated in the housing unit,
wherein the image capturing device is configured to capture the one or more gaming chips accommodated in the housing unit, and
wherein the control device is configured to control the light irradiation device to irradiate light on the problem gaming chip for which the location has been identified.

27. A management system comprising:
an image capturing device configured to capture an image of one or more gaming chips, wherein each gaming chip has a built-in RFID tag storing a first information and has a second information written on a surface thereof to be displayed on the image, wherein the second information is unique for each gaming chip;
a reading device configured to read RFID tags of the one or more gaming chips to obtain the first information of the one or more gaming chips;
an image analysis device configured to obtain a location of each of the one or more gaming chips and the second information of each of the one or more gaming chips based on the image; and
a control device configured to, when there is a specific first information among first information of the one or more gaming chips obtained by the reading device, identify a location of the second information corresponding to the specific first information.

* * * * *